(12) United States Patent
Yamagishi et al.

(10) Patent No.: US 11,479,087 B2
(45) Date of Patent: Oct. 25, 2022

(54) COOLING STRUCTURE OF VEHICLE BATTERY UNIT

(71) Applicant: HONDA MOTOR CO., LTD., Tokyo (JP)

(72) Inventors: Yosuke Yamagishi, Saitama (JP); Michihisa Tsutsumi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 241 days.

(21) Appl. No.: 16/871,373

(22) Filed: May 11, 2020

(65) Prior Publication Data

US 2020/0361289 A1 Nov. 19, 2020

(30) Foreign Application Priority Data

May 16, 2019 (JP) .............................. JP2019-093124

(51) Int. Cl.
*B60H 1/32* (2006.01)
*B60H 1/00* (2006.01)
*B60K 1/04* (2019.01)

(52) U.S. Cl.
CPC ....... *B60H 1/3228* (2019.05); *B60H 1/00278* (2013.01); *B60K 1/04* (2013.01); *B60K 2001/0438* (2013.01)

(58) Field of Classification Search
CPC .............. B60H 1/3228; B60H 1/00278; B60H 1/00392; B60K 11/02; B60K 1/04; B60K 2001/0438; B60K 1/00; H01M 10/625; H01M 10/613; H01M 10/6556; H01M 10/6568; H01M 10/66; H01M 50/204; Y02T 10/70; Y02E 60/10

See application file for complete search history.

(56) References Cited

U.S. PATENT DOCUMENTS 6,024,132 A  *  2/2000  Fujimoto ................ F16L 11/15
                                                   138/121
2011/0262794 A1*  10/2011  Yoon .................... H01M 10/617
                                                   429/120

(Continued)

FOREIGN PATENT DOCUMENTS

CN      105428748 B  *  4/2018  .......... H01M 10/613
CN      109524583 A  *  3/2019  .............. B60L 58/26

(Continued)

*Primary Examiner* — Emmanuel E Duke
(74) *Attorney, Agent, or Firm* — Paratus Law Group, PLLC

(57) ABSTRACT

A cooling structure of a vehicle battery unit includes: a plurality of battery modules; a plurality of battery cooling units; a supply pipe; a discharge pipe; and a battery case. The supply pipe includes a supply pipe portion which passes between the at least two battery modules arranged in the vehicle width direction and connects the plurality of battery cooling units. The discharge pipe includes a discharge pipe portion which passes between the at least two battery modules arranged in the vehicle width direction and connects the plurality of battery cooling unit. The supply pipe portion and the discharge pipe portion have bellows pipe portions which are made of resin and can be expanded or contracted in the front-rear direction and curved pipe portions which are made of resin and bend in the vehicle width direction.

6 Claims, 7 Drawing Sheets

(56) References Cited

U.S. PATENT DOCUMENTS

2017/0305293 A1* 10/2017 Takizawa ............ H05K 7/20872
2022/0059894 A1*  2/2022 Stephens ................ B60L 50/66

FOREIGN PATENT DOCUMENTS

| CN | 109616591 A | * | 4/2019 | .......... H01M 10/613 |
|----|----|----|----|----|
| JP | 6064730 B | * | 8/1986 | |
| JP | 6064730 B2 | | 1/2017 | |
| KR | 20160117955 A | * | 10/2016 | |
| WO | WO-2014122904 A1 | * | 8/2014 | .......... B60L 11/1874 |
| WO | WO-2017033412 A1 | * | 3/2017 | .......... H01M 10/613 |
| WO | WO-2017078249 A1 | * | 5/2017 | .......... H01M 10/613 |

* cited by examiner

COOLING STRUCTURE OF VEHICLE BATTERY UNIT

CROSS-REFERENCE TO RELATED APPLICATIONS

The present application claims the benefit of priority of Japanese Patent Application No. 2019-093124, filed on May 16, 2019, the content of which is incorporated herein by reference.

TECHNICAL FIELD

The present invention relates to a cooling structure of a vehicle battery unit mounted on an electric vehicle or the like.

BACKGROUND ART

Japanese Patent No. 6064730 describes a battery pack in which a plurality of battery modules are accommodated inside a case and a cooling module is arranged below the case. The cooling module includes a battery cooling unit having a refrigerant passage through which refrigerant passes and a pipe connecting the plurality of battery cooling units.

However, in the battery pack described in Japanese Patent No. 6064730, when connecting the plurality of battery cooling units by the pipe, there is a possibility that a dimensional error occurring between the plurality of battery cooling units cannot be absorbed.

SUMMARY

The invention provides a cooling structure of a vehicle battery unit capable of easily absorbing a dimensional error occurring between a plurality of battery cooling units.

According to an aspect of the invention, there is provided a cooling structure of a vehicle battery unit including: a plurality of battery modules, arranged at least two in a vehicle width direction and at least two in a front-rear direction of a vehicle; a plurality of battery cooling units, disposed below the at least two battery modules arranged in the vehicle width direction, the plurality of battery cooling units having refrigerant passages through which refrigerant passes; a supply pipe configured to introduce refrigerant to the plurality of battery cooling units; a discharge pipe configured to discharge the refrigerant from the plurality of battery cooling units; and a battery case configured to accommodate the plurality of battery modules, the plurality of battery cooling units, the supply pipe, and the discharge pipe, wherein: the supply pipe includes a supply pipe portion which passes between the at least two battery modules arranged in the vehicle width direction and connects the plurality of battery cooling units; the discharge pipe includes a discharge pipe portion which passes between the at least two battery modules arranged in the vehicle width direction and connects the plurality of battery cooling units; and the supply pipe portion and the discharge pipe portion have bellows pipe portions which are made of resin and can be expanded or contracted in the front-rear direction and curved pipe portions which are made of resin and bend in the vehicle width direction.

According to the invention, a dimensional error occurring between a plurality of battery cooling units can be easily absorbed.

DESCRIPTION OF EMBODIMENTS

Figure 1:
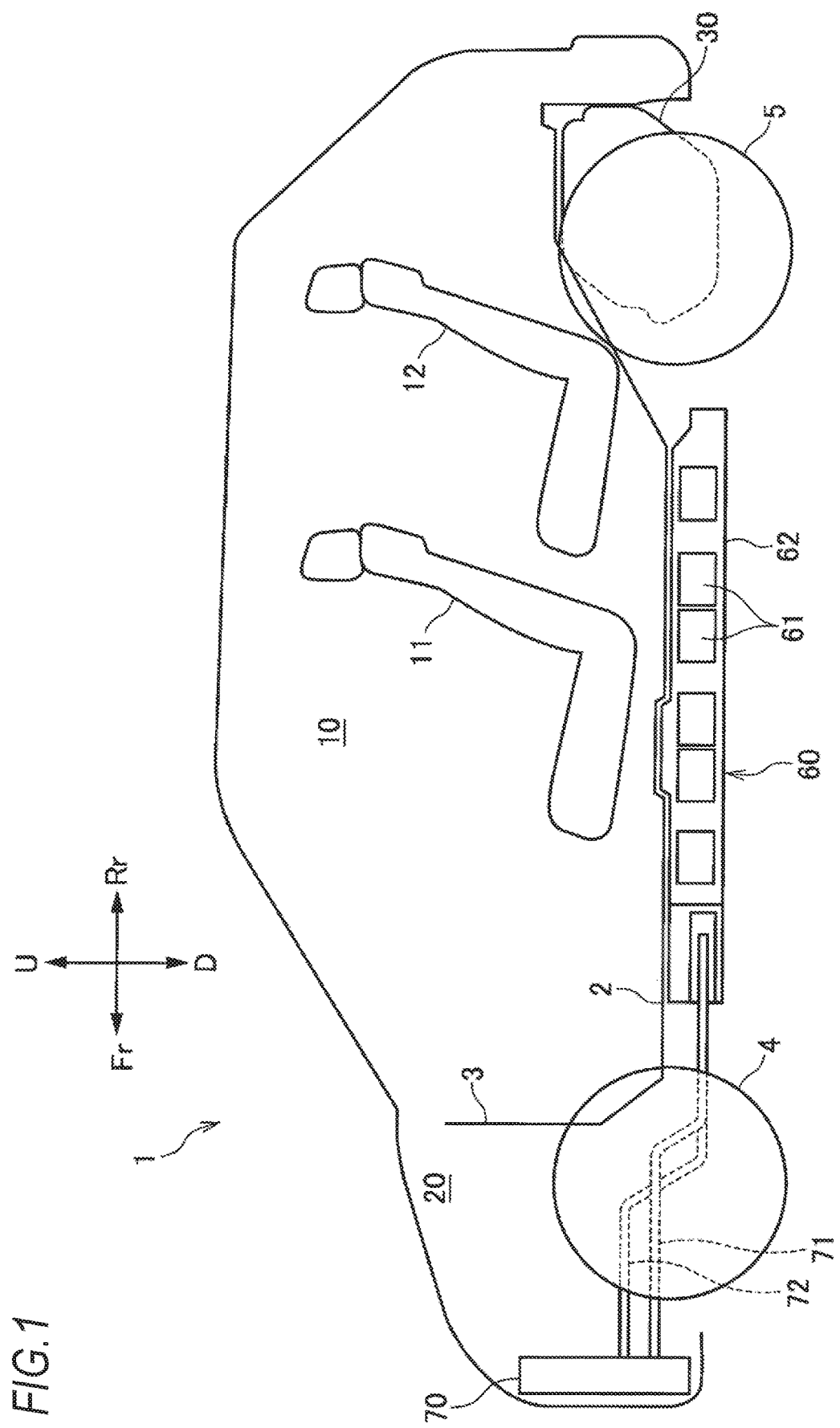
FIG. 1 is a schematic side view illustrating an entire structure of a vehicle on which a vehicle battery unit according to an embodiment of the invention is mounted.

Hereinafter, an embodiment of a cooling structure for a vehicle battery unit of the invention will be described with reference to the drawings. In addition, the drawings shall be viewed in the direction of reference letters, and in the following description, front and rear, left and right, up and down are described according to the direction viewed from an operator of a vehicle. In the drawings, the front of the vehicle is indicated by FR, the rear is indicated by Rr, the left side is indicated by L, the right side is indicated by R, the upper side is indicated by U, and the lower side is indicated by D.

Figure 2:
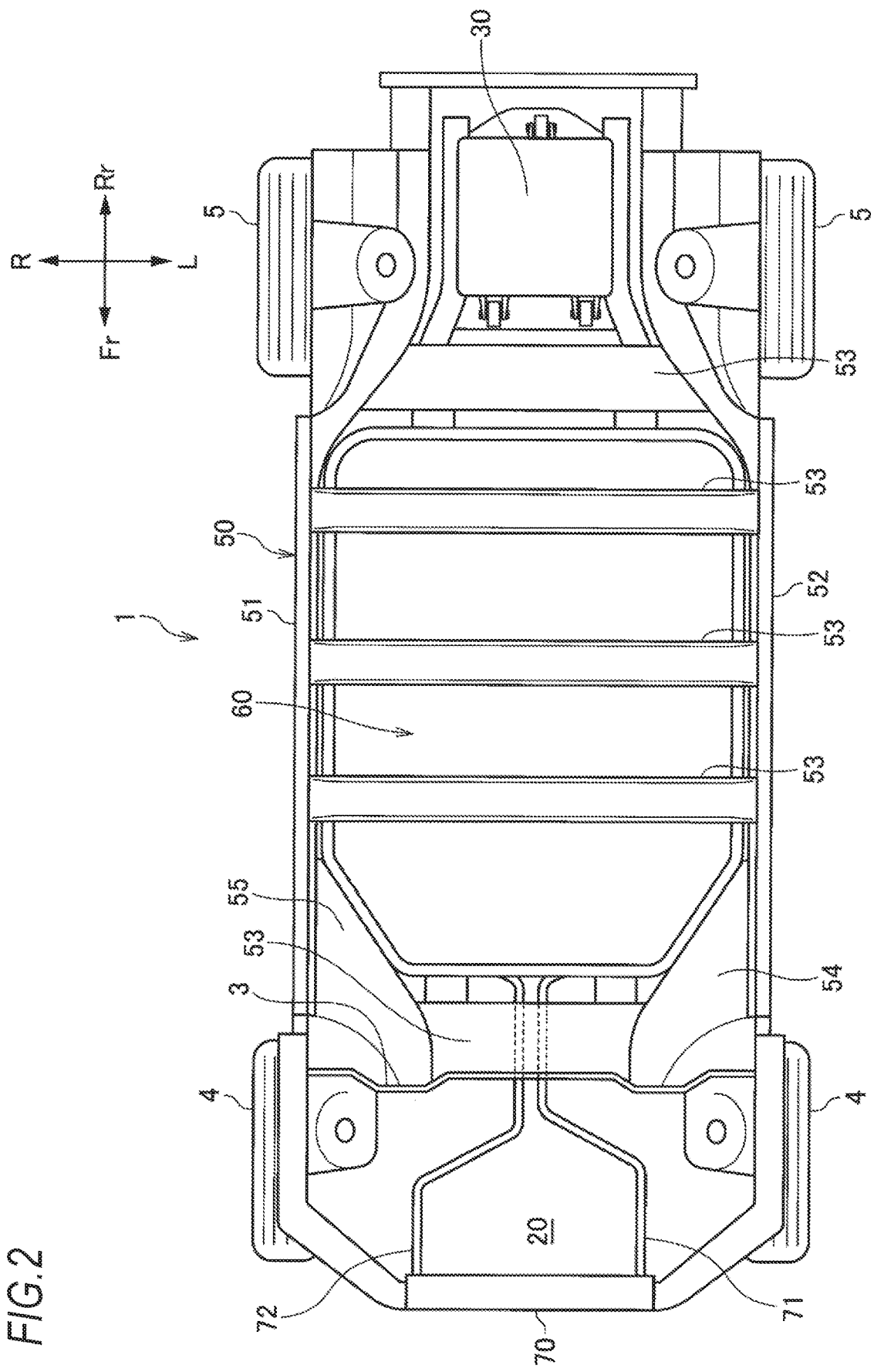
FIG. 2 is a plan view illustrating an underfloor structure of the vehicle in FIG. 1.

As illustrated in FIGS. 1 and 2, a vehicle 1 according to the embodiment of the invention is defined by a floor panel 2 and a dash panel 3 into a cabin 10 and a front room 20 in front of the cabin 10. The cabin 10 is provided with a front seat 11 and a rear seat 12. A drive device unit 30 is provided below the floor panel 2 behind the rear seat 12. The drive device unit 30 drives left and right rear wheels 5. That is, in the vehicle 1, the left and right rear wheels 5 are used as drive wheels and left and right front wheels 4 are used as driven wheels.

Below the cabin 10, a battery unit 60 is arranged. The battery unit 60 is configured by accommodating a plurality of battery modules 61 in a battery case 62 and is arranged below the floor panel 2 in the cabin 10.

A vehicle body frame 50 includes a pair of left and right side sills 51 and 52 extending in a front-rear direction and a plurality of cross members 53 extending in a left-right direction and connecting the side sills 51 and 52 to each other.

The drive device unit 30 includes an electric motor, a Power Control Unit (PCU) as an electric motor control device which controls the electric motor, and a power transmission mechanism which transmits the power of the electric motor to the rear wheels 5.

In the front room 20, a cooling device 70 for cooling the battery unit 60 and the like is provided. The cooling device 70 includes a radiator provided on the forefront of the vehicle 1. The cooling device 70 and the battery unit 60 are connected via an outer supply pipe 71 and an outer discharge pipe 72. An electric pump (not illustrated) is provided in the outer supply pipe 71 or the outer discharge pipe 72.

Figure 4:
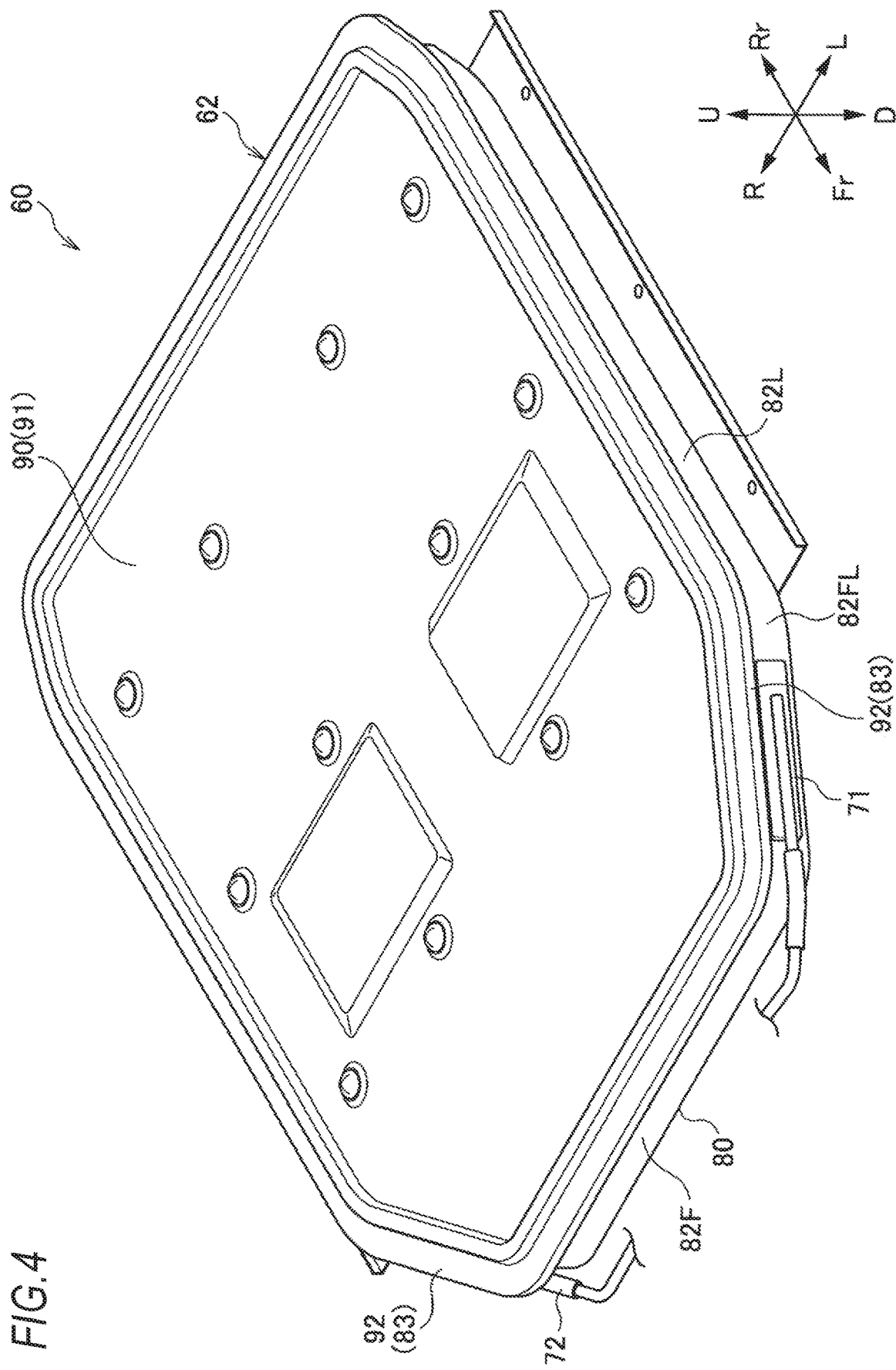
FIG. 4 is a perspective view of the vehicle battery unit in FIG. 1.
Figure 5:
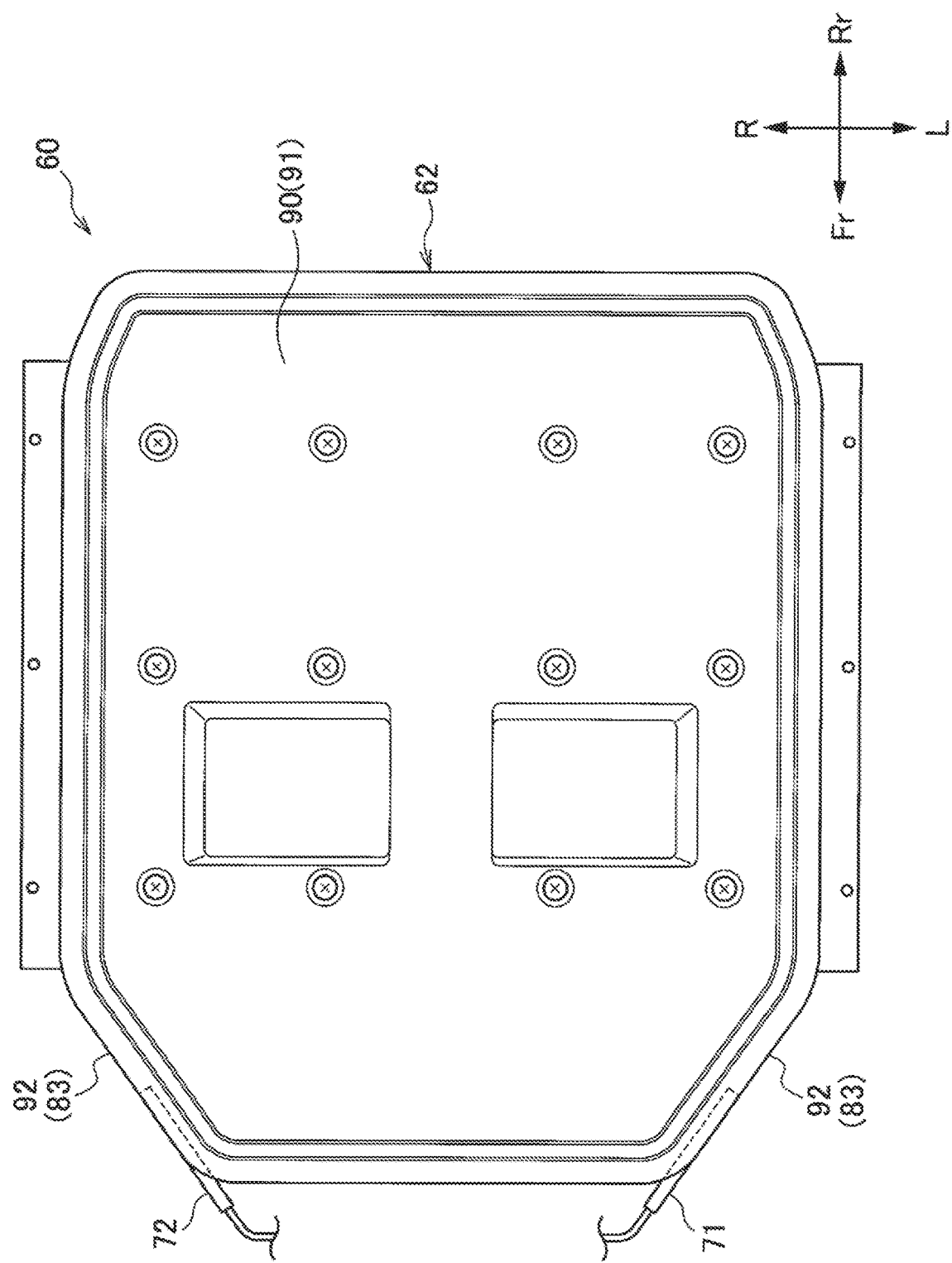
FIG. 5 is a plan view of the vehicle battery unit in FIG. 1.

Next, a main part of the invention, a certain battery unit 60 and its cooling structure will be described with reference to FIGS. 3 to 5.

The battery unit 60 includes a plurality of battery modules 61, a battery cooling unit 63 for cooling the battery module 61, an electric connection box 64 arranged on the front side of the battery module 61, a supply pipe 65 for introducing a refrigerant from outside the battery case 62 to the battery cooling unit 63, a discharge pipe 66 for discharging the refrigerant from the battery cooling unit 63 to the outside of the battery case 62, and the battery case 62 accommodating the battery module 61, the battery cooling unit 63, the electric connection box 64, the supply pipe 65, and the discharge pipe 66.

The plurality of battery modules 61 are arranged in the battery case 62 in the front-rear direction and the left-right direction. The battery unit 60 of the embodiment includes a total of twelve battery modules 61 arranged six in the front-rear direction and two in the left-right direction. In the following description, the six battery modules 61 located on the left side may be referred to as left battery modules 61L and the six battery modules 61 located on the right side may be referred to as right battery modules 61R.

The battery cooling unit 63 is disposed below the battery module 61 and has a refrigerant passage through which the refrigerant passes. In the battery unit 60 of the embodiment, since one battery cooling unit 63 cools two battery modules 61 arranged in the left-right direction, six battery cooling units 63 arranged in the front-rear direction are provided.

The battery cooling unit 63 includes a pair of cooling unit main bodies 631 arranged in a left-right direction and arranged below a pair of battery modules 61 arranged in the left-right direction and a pipe connection portion 632 provided between a pair of cooling unit main bodies 631 arranged in the left-right direction and connected to the supply pipe 65 and the discharge pipe 66. When the refrigerant is supplied from the supply pipe 65 to the pipe connection portion 632, the supplied refrigerant passes through a refrigerant passage formed inside the cooling unit main body 631, and is then discharged from the pipe connection portion 632 to the discharge pipe 66.

The electric connection box 64 accommodates a contact for disconnecting and connecting a conductive path of battery power, a current sensor for detecting a current of the battery power, a ground fault detecting circuit for detecting a ground fault of the battery module 61, and the like. The electric connection box 64 of the embodiment is located on the front side of a pair of battery modules 61 arranged in the front row and arranged in the left-right direction. The left end of the electric connection box 64 is located inside the left end of the left battery module 61L and the right end of the electric connection box 64 is located inside the right end of the right battery module 61R.

The battery case 62 includes a case body 80 accommodating the battery module 61, the battery cooling unit 63, the electric connection box 64, the supply pipe 65, and the discharge pipe 66 and a case lid portion 90 covering an upper opening of the case body 80.

The case body 80 includes a bottom portion 81, a side wall portion 82 rising from an outer edge of the bottom portion 81, and a flange portion 83 extending outward from the upper end of the side wall portion 82. The side wall portion 82 includes a left wall portion 82L and a right wall portion 82R facing each other in the left-right direction, a front wall portion 82F located on the front side of the electric connection box 64, a left inclined wall portion 82FL which connects the front wall portion 82F and the left wall portion 82L, a right inclined wall portion 82FR which connects the front wall portion 82F and the right wall portion 82R, and a rear wall portion 82B which connects rear ends of the left wall portion 82L and the right wall portion 82R. The left inclined wall portion 82FL and the right inclined wall portion 82FR face each other such that the left and right widths are gradually increased as it goes from the front wall portion 82F toward the rear side. The electric connection box 64 is accommodated in a space of which the left and right sides are interposed between the left and right inclined wall portions 82FL and 82FR and the battery module 61 is accommodated in a space of which the left and right sides are interposed between the left and right wall portions 82L and 82R.

The case lid portion 90 includes a lid body portion 91 which covers the upper opening of the case body 80 and a flange portion 92 which extends outward from a peripheral edge of the lid body portion 91. The flange portion 92 is overlapped with the flange portion 83 of the case body 80 and fastened via a plurality of bolts.

The supply pipe 65 includes a first supply pipe portion 651 passing between the electric connection box 64 and the left battery module 61L located in the front row and a second supply pipe portion 652 passing between the left and right battery modules 61. The discharge pipe 66 includes a first discharge pipe portion 661 passing between the electric connection box 64 and the right battery module 61R located in the front row and a second discharge pipe portion 662 passing between the left and right battery modules 61.

According to the arrangement of the supply pipe 65 and the discharge pipe 66, by arranging the supply pipe 65 and the discharge pipe 66 near the center of the battery unit 60 in a vehicle width direction, not only can it be protected from the load at the time of vehicle side collision, but also the space efficiency in the battery case 62 can be improved.

In particular, the first supply pipe portion 651 is arranged between the electric connection box 64 and the left battery module 61L located on the left side and the first discharge pipe portion 661 is arranged between the electric connection box 64 and the right battery module 61R located on the right side. In other words, the first supply pipe portion 651 and the first discharge pipe portion 661 are arranged in opposite directions. Therefore, the space efficiency in the battery case 62 can be further improved.

Further, the supply pipe 65 and the discharge pipe 66 are arranged at a position lower than the upper surface of the battery module 61 and the upper surface of the electric connection box 64. Thereby, the height of the battery unit 60 can be suppressed.

The supply pipe 65 and the discharge pipe 66 are arranged so that their heights are substantially constant. With this configuration, the accumulation of air in the pipe can be suppressed, so that it is not necessary to provide a breathing mechanism, and thus the structure can be simplified.

Also, an outer pipe connection portion 653 of the supply pipe 65 is joined to the left inclined wall portion 82FL of the battery case 62 and the outer pipe connection portion 663 of the discharge pipe 66 is connected to the right inclined wall portion 82FR of the battery case 62. In this way, at the time of a side collision, a load is applied to the left wall portion 82L or the right wall portion 82R before the outer pipe connection portions 653 and 663 of the pipes 65 and 66. Therefore, the outer pipe connection portions 653 and 663 of the pipes 65 and 66 can be protected.

The outer pipe connection portion 653 of the supply pipe 65 is arranged outside the battery case 62 and is connected to the outer supply pipe 71 extending along the left inclined wall portion 82FL. The outer pipe connection portion 663 of the discharge pipe 66 is arranged outside the battery case 62 and is connected to the outer discharge pipe 72 extending along the right inclined wall portion 82FR. In this case, the outer supply pipe 71 extends along the left inclined wall portion 82FL and the outer discharge pipe 72 extends along the right inclined wall portion 82FR. As a result, in the event of a side collision, the outer supply pipe 71 and the outer discharge pipe 72 can also be protected.

Of the outer supply pipe 71 and the outer discharge pipe 72, at least a portion extending along the left inclined wall portion 82FL or right inclined wall portion 82FR is disposed below the flange portions 83 and 92 of the battery case 62 and inside the outer edges of the flange portions 83 and 92. In this way, the outer supply pipe 71 and the outer discharge pipe 72 can be more appropriately protected at the time of a side collision.

Also, as illustrated in FIG. 2, a left reinforcement member 54 which has a substantially triangular shape in a plan view is provided between the left side sill 51 and the left inclined wall portion 82FL of the battery case 62 and a right reinforcement member 55 which has a substantially triangular shape in a plan view is provided between the right side sill 52 and the right inclined wall portion 82FR of the battery case 62. In this way, the outer supply pipe 71 and the outer discharge pipe 72 can be more appropriately protected at the time of a side collision.

Next, the structure of the supply pipe 65 and the discharge pipe 66, which are main parts of the invention, and the structure of the connection portion between the supply pipe 65 and the discharge pipe 66 and the battery cooling unit 63 will be described with reference to FIGS. 3, 6, and 7.

A supply-side connection portion 633 connected to the second supply pipe portion 652 of the supply pipe 65 and a discharge-side connection portion 634 connected to the second discharge pipe portion 662 of the discharge pipe 66 are provided in the pipe connection portion 632 of each battery cooling unit 63 so as to protrude upward. The second supply pipe portion 652 of the supply pipe 65 includes a plurality of supply pipe joint portions 654. By connecting those supply pipe joint portions 654 to the respective supply-side connection portions 633 of the battery cooling units 63, the supply-side connection portions 633 of the plurality of battery cooling units 63 are connected to each other. The second discharge pipe portion 662 of the discharge pipe 66 includes a plurality of discharge pipe joint portions 664. By connecting those discharge pipe joint portions 664 to the respective discharge-side connection portions 634 of the battery cooling units 63, the discharge-side connection portions 634 of the plurality of battery cooling units 63 are connected to each other.

The second supply pipe portion 652 of the supply pipe 65 includes a connection pipe portion 655 which connects the adjacent supply pipe joint portions 654 and the second discharge pipe portion 662 of the discharge pipe 66 includes a connection pipe portion 665 which connects the adjacent discharge pipe joint portions 664. The connection pipe portions 655 and 665 integrally have bellows pipe portions 656 and 666 which are made of resin and can expand or contract in the front-rear direction and curved pipe portions 657, 658, 667, and 668 which are made of resin and bend in the left-right direction. According to such supply pipe 65 and discharge pipe 66, the bellows pipe portions 656 and 666 and the curved pipe portions 657, 658, 667, and 668 are flexibly changed in shape. Therefore, a dimensional error generated between the battery cooling units 63 can be easily absorbed.

Figure 3:
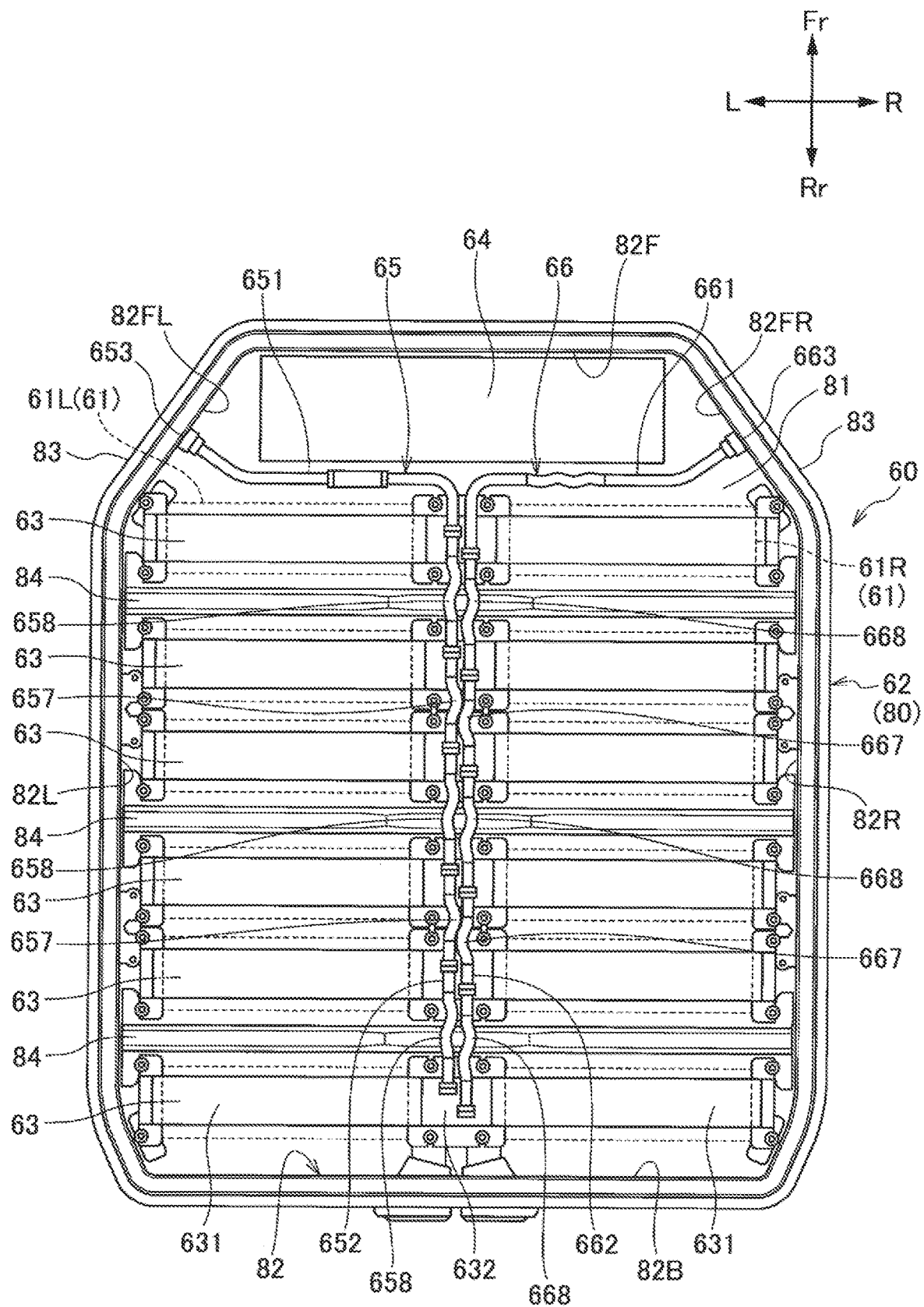
FIG. 3 is a plan view illustrating a cooling structure of the vehicle battery unit in FIG. 1.

As illustrated in FIG. 3, the battery case 62 of the embodiment includes a plurality of cross members 84 extending in the left-right direction in order to increase rigidity against a load in the left-right direction. More specifically, the battery case 62 includes three cross members 84 arranged in parallel in the front-rear direction at predetermined intervals on the upper surface side of the bottom portion 81 of the case body 80. One battery cooling unit 63 is arranged in front of the cross member 84 of the three cross members 84, which is the cross member 84 located on the foremost side and two battery cooling units 63 arranged in front and rear are arranged between the cross member 84 located on the foremost side and the second cross member 84 located behind the foremost cross member 84. Further, two battery cooling units 63 arranged in front and rear are arranged between the second cross member 84 and the third cross member 84 located behind the second cross member 84 and one battery cooling unit 63 is arranged behind the third cross member 84.

The second supply pipe portion 652 of the supply pipe 65 and the second discharge pipe portion 662 of the discharge pipe 66 extend in the front-rear direction above the cross member 84. The curved pipe portions 657, 658, 667, and 668 of the supply pipe 65 and the discharge pipe 66 have an S-shape in a region connecting the battery cooling units 63 with crossing the cross member 84 and have a V-shape in a region connecting the battery cooling units 63 without crossing the cross member 84. That is, when the region connecting the battery cooling units 63 with crossing the cross member 84 is composed of the V-shaped curved pipe portions 657 and 667, the length in the front-rear direction may be insufficient and the dimensional error may not be absorbed. However, by using the S-shaped curved pipe portions 658 and 668 in the region connecting the battery cooling units 63 with crossing the cross member 84, the required length can be secured and the dimensional error can be reliably absorbed. In addition, since the pipe shapes of the connection pipe portions 655 and 665 can be configured in two specifications, it is possible to suppress an increase in component costs.

Figure 6:
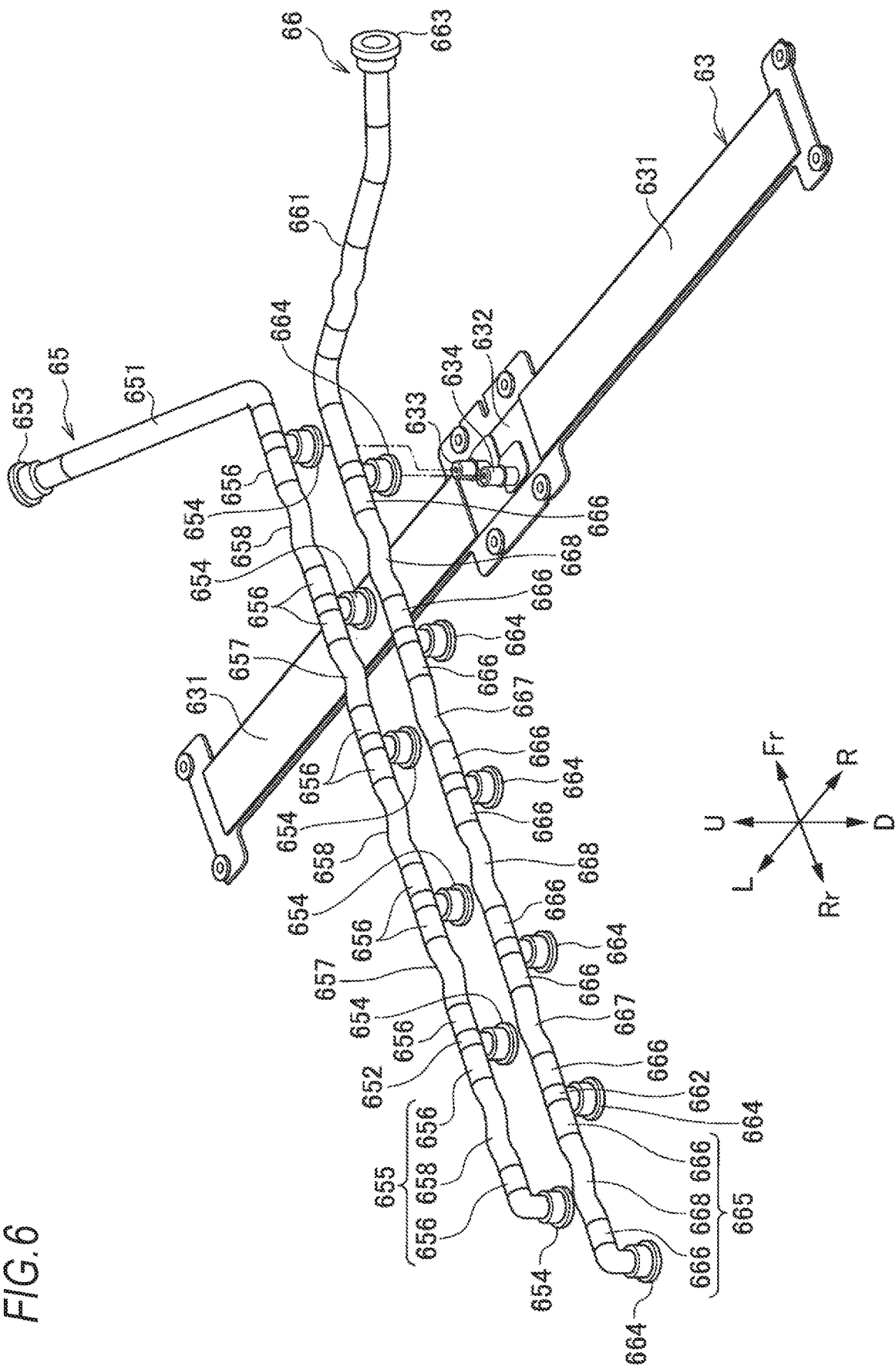
FIG. 6 is an exploded perspective view in which main parts of the cooling structure of the vehicle battery unit in FIG. 3 are exploded.
Figure 7:
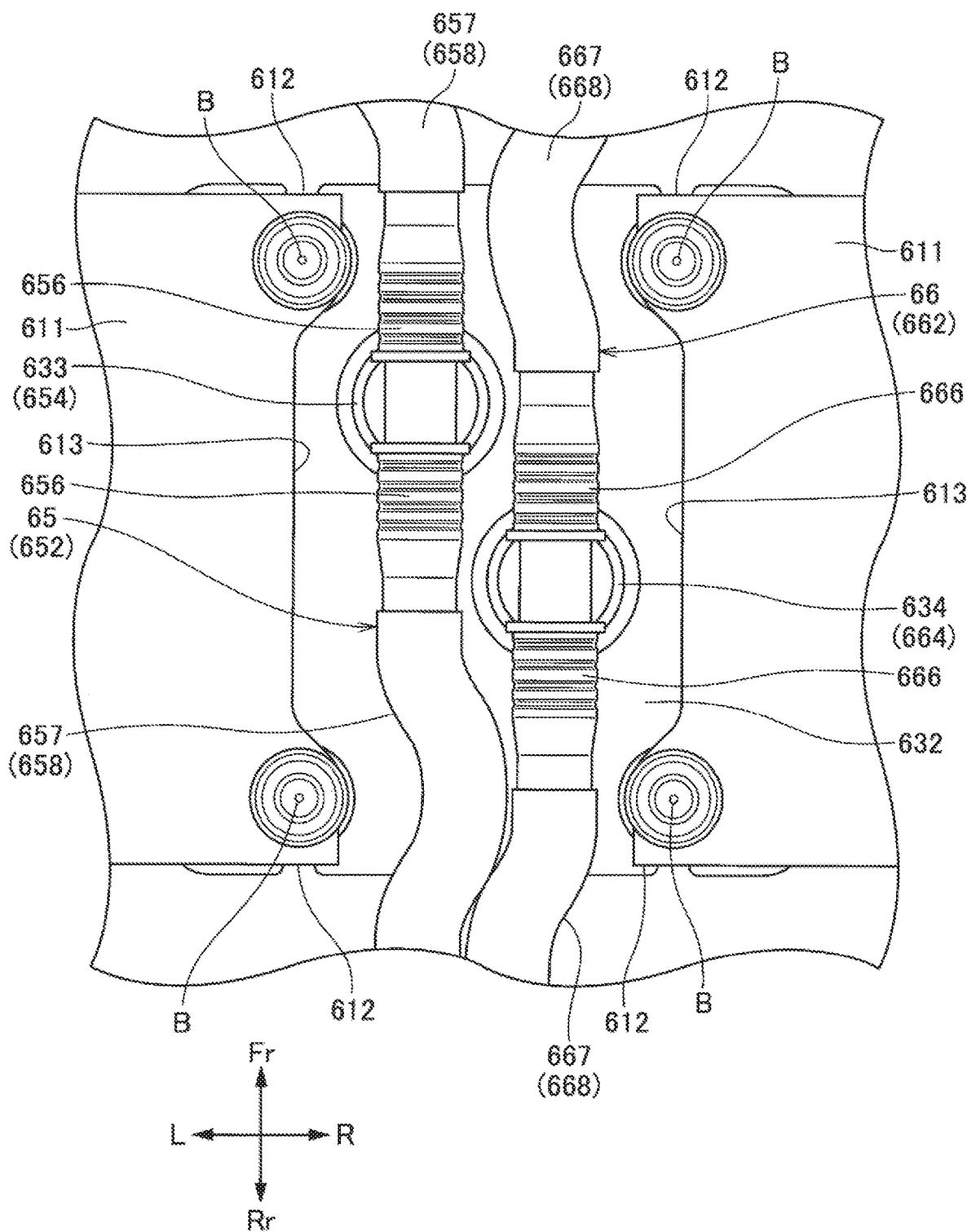
FIG. 7 is an enlarged plan view in which main parts of the cooling structure of the vehicle battery unit in FIG. 3 are enlarged.

As illustrated in FIGS. 6 and 7, the supply-side connection portion 633 and the discharge-side connection portion 634 of each battery cooling unit 63 are offset in the front-rear direction. As described above, when the supply-side connection portion 633 and the discharge-side connection portion 634 are offset in the front-rear direction, the connection work with the supply pipe 65 and the discharge pipe 66 is facilitated, so that the assembling workability can be improved.

In addition, it is desirable that at least one of the supply-side connection portion 633 and the discharge-side connection portion 634 of each battery cooling unit 63 and the supply pipe joint portion 654 and the discharge pipe joint portion 664 connected to the supply-side connection portion 633 and the discharge-side connection portion 634 overlaps in the left-right direction. In this way, the space efficiency of the supply pipe 65 and the discharge pipe 66 is improved, so that the mounting density of the battery module 61 can be increased.

Each battery module 61 has a plate-shaped bottom plate 611 (see FIG. 7) at the bottom. The bottom plate 611 is fixed to the battery case 62 at both end portions in the left-right direction by two fixing portions 612 separated in the front-rear direction. Specifically, the fixing portion 612 of the bottom plate 611 is fixed to the battery case 62 via a bolt B extending upward from the bottom portion 81 of the battery case 62 and penetrating the battery cooling unit 63 and the fixing portion 612.

As illustrated in FIG. 7, in the bottom plate 611, in portions on sides facing the second supply pipe portion 652 and the second discharge pipe portion 662 and between the two fixing portions 612 in the front-rear direction, concave portions 613 recessed on the sides away from second supply pipe portion 652 and second discharge pipe portion 662 are provides. The supply-side connection portion 633 and the discharge-side connection portion 634 of each battery cooling unit 63 are arranged between the two fixing portions 612 in the front-rear direction. According to such the bottom plate 611, while avoiding interference between the bottom plate 611, the second supply pipe portion 652, and the second discharge pipe portion 662, the battery module 61, the second supply pipe portion 652, and the second discharge pipe portion 662 can be disposed close to each other. Therefore, the space efficiency in the battery case 62 is improved, and thus the mounting density of the battery module 61 can be increased.

The embodiment described above can be appropriately modified, improved, and the like.

For example, in the embodiment described above, the supply pipe 65 is arranged on the left and the discharge pipe 66 is arranged on the right. However, the supply pipe 65 may be arranged on the right and the discharge pipe 66 may be arranged on the left. Further, the curved pipe portion may have only an S-shape or a V-shape and may adopt any shape as long as it is bent in the vehicle width direction.

At least the following matters are described in this specification. In addition, although the corresponding components in the embodiment described above are shown in parentheses, the invention is not limited to this.

(1) A cooling structure of a vehicle battery unit (battery unit 60) which includes a plurality of battery modules (battery modules 61) which are arranged at least two in a vehicle width direction and at least two in a front-rear direction of a vehicle, a plurality of battery cooling units (battery cooling units 63) which are disposed below the at least two battery modules arranged in the vehicle width direction and have refrigerant passages through which refrigerant passes, a supply pipe (supply pipe 65) for introducing refrigerant to the plurality of battery cooling units, a discharge pipe (discharge pipe 66) for discharging the refrigerant from the plurality of battery cooling units, and a battery case (battery case 62) which accommodates the plurality of battery modules, the plurality of battery cooling units, the supply pipe, and the discharge pipe, where the supply pipe includes a supply pipe portion (second supply pipe portion 652) which passes between the at least two battery modules arranged in the vehicle width direction and connects the plurality of battery cooling units, and the discharge pipe includes a discharge pipe portion (second discharge pipe portion 662) which passes between the at least two battery modules arranged in the vehicle width direction and connects the plurality of battery cooling units, and the supply pipe portion and the discharge pipe portion have bellows pipe portions (bellows pipe portions 656 and 666) which are made of resin and can be expanded or contracted in the front-rear direction and curved pipe portions (curved pipe portions 657, 658, 667, and 668) which are made of resin and bend in the vehicle width direction.

According to (1), connecting a plurality of battery cooling units with pipes requires a structure which can absorb dimensional errors. However, by constituting the supply pipe portion and the discharge pipe portion with the bellows pipe portion made of resin and the curved pipe portion made of resin, the dimensional error can be easily absorbed by flexibly changing the shape of the bellows pipe portion and the curved pipe portion. Also, in normal piping, metal pipes are connected with rubber hoses and metal pipes and rubber hoses are fixed with clips. However, compared with this, it is possible to reduce the weight and the number of parts, and to further improve the assembling workability.

(2) The cooling structure of the vehicle battery unit according to (1), where the supply pipe and the discharge pipe are arranged such that the heights are substantially constant.

According to (2), the supply pipe and the discharge pipe are arranged such that the heights are substantially constant, so that accumulation of air in the pipes can be suppressed. Accordingly, it is not necessary to provide a breathing mechanism, and thus the structure can be simplified.

(3) The cooling structure of the vehicle battery unit according to (1) or (2), where each battery cooling unit includes a supply-side connection portion (supply-side connection portion 633) connected to a supply pipe joint portion (supply pipe joint portion 654) of the supply pipe portion and a discharge-side connection portion (discharge-side connection portion 634) connected to a discharge pipe joint portion (discharge pipe joint portion 664) of the discharge pipe portion, and the supply-side connection portion and the discharge-side connection portion are offset in the front-rear direction.

According to (3), the supply-side connection portion and the discharge-side connection portion are offset in the front-rear direction, so that the assembling workability is improved.

(4) The cooling structure of the vehicle battery unit according to (3), where at least one of the supply-side connection portion and the discharge-side connection portion and the supply pipe joint portion and the discharge pipe joint portion overlaps in the vehicle width direction.

According to (4), the space efficiency of the supply pipe and the discharge pipe is improved. As a result, the mounting density of the battery module can be increased.

(5) The cooling structure of the vehicle battery unit according to any one of (1) to (4), where the battery case has a cross member (cross member 84) extending in the vehicle width direction, the supply pipe and the discharge pipe extend in the front-rear direction above the cross member, and the curved pipe portion has an S-shape in a region connecting the battery cooling units with crossing the cross member and has a V-shape in a region connecting the battery cooling units without crossing the cross member.

According to (5), in the region where the battery cooling units are connected to each other with crossing the cross member, the length of the V-shaped pipe is insufficient, and thus the dimensions cannot be absorbed. Therefore, in the region where the battery cooling units are connected to each other with crossing the cross member, the use of S-shaped piping allows the shape of the pipes to be completed in two specifications, thereby suppressing an increase in component costs.

(6) The cooling structure of the vehicle battery unit according to any one of (1) to (5), where each battery module has a plate-shaped bottom plate (bottom plate 611) at the bottom, the bottom plate is fixed to the battery case at two fixing portions (fixing portions 612) separated in the front-rear direction at both end portions in the vehicle width direction, each battery cooling unit includes a supply-side connection portion (supply-side connection portion 633) connected to a supply pipe joint portion (supply pipe joint portion 654) of the supply pipe portion and a discharge-side connection portion (discharge-side connection portion 634) connected to a discharge pipe joint portion (discharge pipe joint portion 664) of the discharge pipe portion, concave portions (concave portions 613) are provided in the bottom plate on sides facing the supply pipe portion and the discharge pipe portion, and between the two fixing portions in the front-rear direction, and the supply-side connection portion and the discharge-side connection portion are disposed between the two fixing portions in the front-rear direction.

According to (6), the supply-side connection portion and the discharge-side connection portion are arranged between the two fixing portions in the front-rear direction. Therefore, the battery module and the supply pipe portion and the discharge pipe portion can be arranged close to each other while avoiding interference between the bottom plate and the supply-side connection portion and the discharge-side connection portion. As a result, the space efficiency in the battery case is improved, and thus the mounting density of the battery module can be increased.

The invention claimed is:

1. A cooling structure of a vehicle battery unit comprising:
    a plurality of battery modules, arranged at least two in a vehicle width direction and at least two in a front-rear direction of a vehicle;
    a plurality of battery cooling units, disposed below the at least two battery modules arranged in the vehicle width direction, the plurality of battery cooling units having refrigerant passages through which refrigerant passes;
    a supply pipe configured to introduce refrigerant to the plurality of battery cooling units;
    a discharge pipe configured to discharge the refrigerant from the plurality of battery cooling units; and
    a battery case configured to accommodate the plurality of battery modules, the plurality of battery cooling units, the supply pipe, and the discharge pipe, wherein:
    the supply pipe includes a supply pipe portion which passes between the at least two battery modules arranged in the vehicle width direction and connects the plurality of battery cooling units;
    the discharge pipe includes a discharge pipe portion which passes between the at least two battery modules arranged in the vehicle width direction and connects the plurality of battery cooling units; and
    the supply pipe portion and the discharge pipe portion have bellows pipe portions which are made of resin and can be expanded or contracted in the front-rear direction and curved pipe portions which are made of resin and bend in the vehicle width direction.

2. The cooling structure of the vehicle battery unit according to claim 1, wherein
    the supply pipe and the discharge pipe are arranged such that the heights are substantially constant.

3. The cooling structure of the vehicle battery unit according to claim 1, wherein:
    each battery cooling unit includes a supply-side connection portion connected to a supply pipe joint portion of the supply pipe portion and a discharge-side connection portion connected to a discharge pipe joint portion of the discharge pipe portion; and
    the supply-side connection portion and the discharge-side connection portion are offset in the front-rear direction.

4. The cooling structure of the vehicle battery unit according to claim 3, wherein
    at least one of the supply-side connection portion and the discharge-side connection portion and the supply pipe joint portion and the discharge pipe joint portion overlaps in the vehicle width direction.

5. The cooling structure of the vehicle battery unit according to claim 1, wherein:
    the battery case has a cross member extending in the vehicle width direction;
    the supply pipe and the discharge pipe extend in the front-rear direction above the cross member; and
    the curved pipe portion has an S-shape in a region connecting the battery cooling units with crossing the cross member and has a V-shape in a region connecting the battery cooling units without crossing the cross member.

6. The cooling structure of the vehicle battery unit according to claim 1, wherein:
    each battery module has a plate-shaped bottom plate at the bottom;
    the bottom plate is fixed to the battery case at two fixing portions separated in the front-rear direction at both end portions in the vehicle width direction;
    each battery cooling unit includes a supply-side connection portion connected to a supply pipe joint portion of the supply pipe portion and a discharge-side connection portion connected to a discharge pipe joint portion of the discharge pipe portion;
    concave portions are provided in the bottom plate on sides facing the supply pipe portion and the discharge pipe portion, and between the two fixing portions in the front-rear direction; and
    the supply-side connection portion and the discharge-side connection portion are disposed between the two fixing portions in the front-rear direction.

* * * * *